US011813556B2

(12) United States Patent
Canaia

(10) Patent No.: US 11,813,556 B2
(45) Date of Patent: Nov. 14, 2023

(54) DEVICE FOR THE CONTINUOUS FILTRATION OF MOLTEN PLASTIC MATERIAL

(71) Applicant: FIMIC S.R.L., Carmignano di Brenta (IT)

(72) Inventor: Erica Canaia, Carmignano di Brenta (IT)

(73) Assignee: FIMIC s.r.l., Carmignano di Brenta (IT)

( * ) Notice: Subject to any disclaimer, the term of this patent is extended or adjusted under 35 U.S.C. 154(b) by 25 days.

(21) Appl. No.: 17/461,062

(22) Filed: Aug. 30, 2021

(65) Prior Publication Data

US 2022/0062803 A1   Mar. 3, 2022

(30) Foreign Application Priority Data

Sep. 1, 2020  (IT) ........................ 102020000020824

(51) Int. Cl.
*B01D 33/048* (2006.01)
*B01D 33/80* (2006.01)
*B29B 13/10* (2006.01)

(52) U.S. Cl.
CPC ......... *B01D 33/048* (2013.01); *B01D 33/803* (2013.01); *B29B 13/10* (2013.01)

(58) Field of Classification Search
None
See application file for complete search history.

(56) References Cited

U.S. PATENT DOCUMENTS

| | | | | |
|---|---|---|---|---|
| 3,503,096 A | * | 3/1970 | Marianelli | B01D 35/12 425/190 |
| 6,216,880 B1 | * | 4/2001 | Previero | B01D 29/52 210/429 |
| 6,994,795 B2 | * | 2/2006 | Bacher | B29C 48/475 425/197 |
| 2008/0217255 A1 | * | 9/2008 | Pohl | B29C 48/2725 210/739 |

FOREIGN PATENT DOCUMENTS

| | | |
|---|---|---|
| DE | 19701002 A1 | 7/1998 |
| EP | 1550544 A1 | 6/2005 |
| EP | 1550544 B1 * | 6/2008 ........... B01D 33/044 |
| JP | S55154112 A | 12/1980 |
| JP | S61175016 A | 8/1986 |
| WO | 2016174152 A1 | 11/2016 |

* cited by examiner

*Primary Examiner* — Hayden Brewster
(74) *Attorney, Agent, or Firm* — QUICKPATENTS, LLC; Kevin Prince

(57) ABSTRACT

A filtering device for filtering molten plastic material that employs a filtration mesh belt that enters and exits a chamber, engaging an outer surface of a hollow perforated cylinder inside of the chamber, without losing any molten plastic material during the replacement of the filtration mesh belt and without tearing even when operating at high pressures inside of the chamber.

13 Claims, 13 Drawing Sheets

DEVICE FOR THE CONTINUOUS FILTRATION OF MOLTEN PLASTIC MATERIAL

CROSS-REFERENCE TO RELATED APPLICATIONS

This application claims the benefit of Italian Patent Application 102020000020824, filed on Sep. 1, 2020, and is incorporated herein by reference.

STATEMENT REGARDING FEDERALLY SPONSORED RESEARCH AND DEVELOPMENT

Not Applicable.

FIELD OF THE INVENTION

This invention relates to a device for the continuous filtering of molten plastic material that uses a mesh filter belt.

BACKGROUND

A system for filtering plastic material is known, from the same applicant, namely patent EP1550544 which is referred to and incorporated by reference.

The known filtering system is comprised of a device for the automated continuous cleaning of contaminated plastic material in the molten state by means of a metal mesh belt with a suitable weft.

The known device for the continuous filtering of molten plastic consists of a chamber inside a body with an opening for the entry of the plastic material to be filtered and an opening for the exit of the filtered plastic material; there is also an opening for the continuous entry and exit of a quite narrow metal mesh that, when crossed by the molten plastic materials, filters their contaminants; the metal mesh strip inside the chamber is resting against the outer surface of a hollow perforated cylinder that rotates around its main axis, a pair of sealing rollers, parallel to the hollow perforated cylinder, delimit the portion of the mesh strip resting against the perforated hollow cylinder, where the pair of sealing rollers with a metal mesh interposed between them and the perforated hollow cylinder, generates the sealing of the molten plastic material entering from the inlet opening, and also a further pair of rollers accompanying the mesh, parallel to the sealing rollers, to which an inlet and an outlet branch of the metal mesh are attached respectively, and a further floating roller placed with the inlet and outlet mesh branches interposed resting above the accompanying rollers centrally in their interspace.

The known device is able to successfully achieve its purpose for averagely polluted material and with high pressures that are not excessively high.

However, the known system appears to exhibit unsatisfactory behaviour when there are critical conditions, namely when there are materials that are highly polluted and/or there are high pressures, since in the system there could sometimes be a tear in the mesh and/or a small, albeit appreciable, loss of material through the inlet/outlet opening.

Since the demand for filtering is become much more intensive, both for materials with different characteristics and with different levels of contamination, which is increasingly rising to values that could not be treated in the past, the known filtering system is no longer adequate.

SUMMARY OF THE INVENTION

Objects of the Invention

The object of the present invention is to make available a filtering device that can overcome one or more of the drawbacks set out above.

An important object of the present invention is to make available a filtering device that can easily remove contaminants from molten plastic material.

An important object of the present invention is to make available a filtering device that can also operate at high pressures.

An essential object of the present invention is to make available a filtering device that, within the scope of the preceding object, carries out the filtration with sufficient continuity, without the metal mesh suddenly breaking.

An equally important object of the present invention is to make available a filtering device that, within the scope of one or more of the preceding objects, allows at least a partial change of the metal mesh without interrupting the work flow.

Another object of the present invention is to make available a filtering device that limits and reduces, with respect to known devices, the loss of molten plastic material, especially when the metal mesh has to be changed.

All the aforesaid objects, and others which will become more apparent from the continuation of the description, are obtained from the invention characterised by the features highlighted in the claims.

Explanation of the Invention

All the aforesaid objects are achieved and solved by the filtering device according to the claims.

In particular, the filtering device for filtering molten plastic material comprises
  a body,
  a chamber inside the body,
  a hollow perforated cylinder that rotates around its main axis inside the chamber,
  an inlet opening on the body for the entry into the chamber of the plastic material to be filtered, and
  an outlet opening for the exit of the filtered plastic material from the body,
  a connecting opening that connects the outside of the body with the internal chamber,
  a filtration mesh strip that enters the chamber through the connection opening and exits through the connection opening after having carried out the filtration; where
    a section of inlet-mesh that enters the chamber from the outside of the body through an inlet path, and continuously moving forward,
    a stretch of the adjoining-mesh that remains engaged to the outer surface of the hollow perforated cylinder, and continuously moving forward,
    a section of outlet-mesh that exits the body from the chamber through an exit path,
  where the inlet-mesh, the resting-mesh and the outlet-mesh, a continuous belt, and a movable cone that creates, together with the body, the entry path and the exit path, where the cone can move between a first closing position and a second opening position on the opening that connects the exterior of the body with the chamber and that, in the first closing position, closes the entry path and closes the exit path and in the second opening position opens the entry path and opens the exit path;

where the entry path is a first channel between the outside of the body and the inside of the chamber, with a width corresponding to the width of the mesh belt and enclosed between the body itself and a first side wall of the cone and where the exit path is a second channel between the outside of the body and the inside of the chamber, with a width corresponding to the width of the mesh strip and enclosed between the body itself and a second side wall of the cone and where the cone has a base wall between the first and the second side wall, facing towards the inside of the chamber, facing the perforated hollow cylinder.

The mobile cone in the closed position is close to the walls of the connection opening, with the inlet-mesh strip interposed in the inlet path and the outlet-mesh strip interposed in the exit path, preventing the melted plastic material within the chamber inside the body from escaping.

The movable cone in the open position is spaced apart from the connecting opening walls, since the inlet-mesh can slide in the inlet path to enter the chamber inside the body, and the mesh-outlet can slide in the outlet path to exit the chamber inside the body.

Advantageous Characteristics of the Invention

Advantageously, the base wall of the cone has a profile corresponding to the underlying circular arc of the perforated hollow cylinder, limiting the molten material between the outer wall of the hollow cylinder and the base wall of the cone.

Advantageously, the cone is moved by an actuator externally joined to the cusp of the cone, resulting in a linear movement symmetrically established with respect to the cone.

Advantageously, the cone and/or the body at the inlet and/or outlet paths of the filtering mesh have plates of hardened/bonded material, limiting the wear of the corresponding walls during the relative movement of the mesh.

Advantageously, the body has an opening between the inside of the hollow and an accumulation tank for accumulating the molten plastic material during the change and replacement of the mesh clogged by the contamination of the molten material, reducing the pressure inside the chamber.

Advantageously, the accumulation tank is a variable volume tank and has a movable piston that defines the capacity of the tank, and whose movement to increase the capacity favours the accumulation of the molten material coming from the cavity of the chamber and whose movement to decrease the capacity favours the return of the molten material into the cavity of the chamber.

Advantageously, the body has a valved opening between the inside of the cavity and the outside of the body in order to be able to open, by acting on the valve inserted in the opening, releasing the molten material coming from the hollow chamber of the chamber and reducing the pressure inside the chamber.

Advantageously, the aforesaid opening towards the accumulation tank and the aforesaid valved opening, by decreasing the pressure inside the chamber when the clogged mesh is changed and replaced, allow the size of the actuator that moves the cone to be limited.

Advantageously, the device is provided on the outside of the body with a winder/advancing device for storing/advancing the clogged filtration mesh exiting the body.

Advantageously, the winder/feeder is motorised with a feed that keeps the clogged filtration mesh under tension when exiting the body.

Advantageously, the motorisation of the winder is provided with a torque control and a clutch that prevent the clogged filtration mesh from being torn.

DESCRIPTION OF THE DRAWINGS

The technical characteristics of the invention, according to the aforementioned objects, can be clearly seen from the content of the claims below and the relative results will be apparent in the detailed description that follows with reference to the drawings, which illustrate a purely exemplary and non-limiting embodiment, in which:

DETAILED DESCRIPTION OF THE PREFERRED EMBODIMENT

Figure 1:
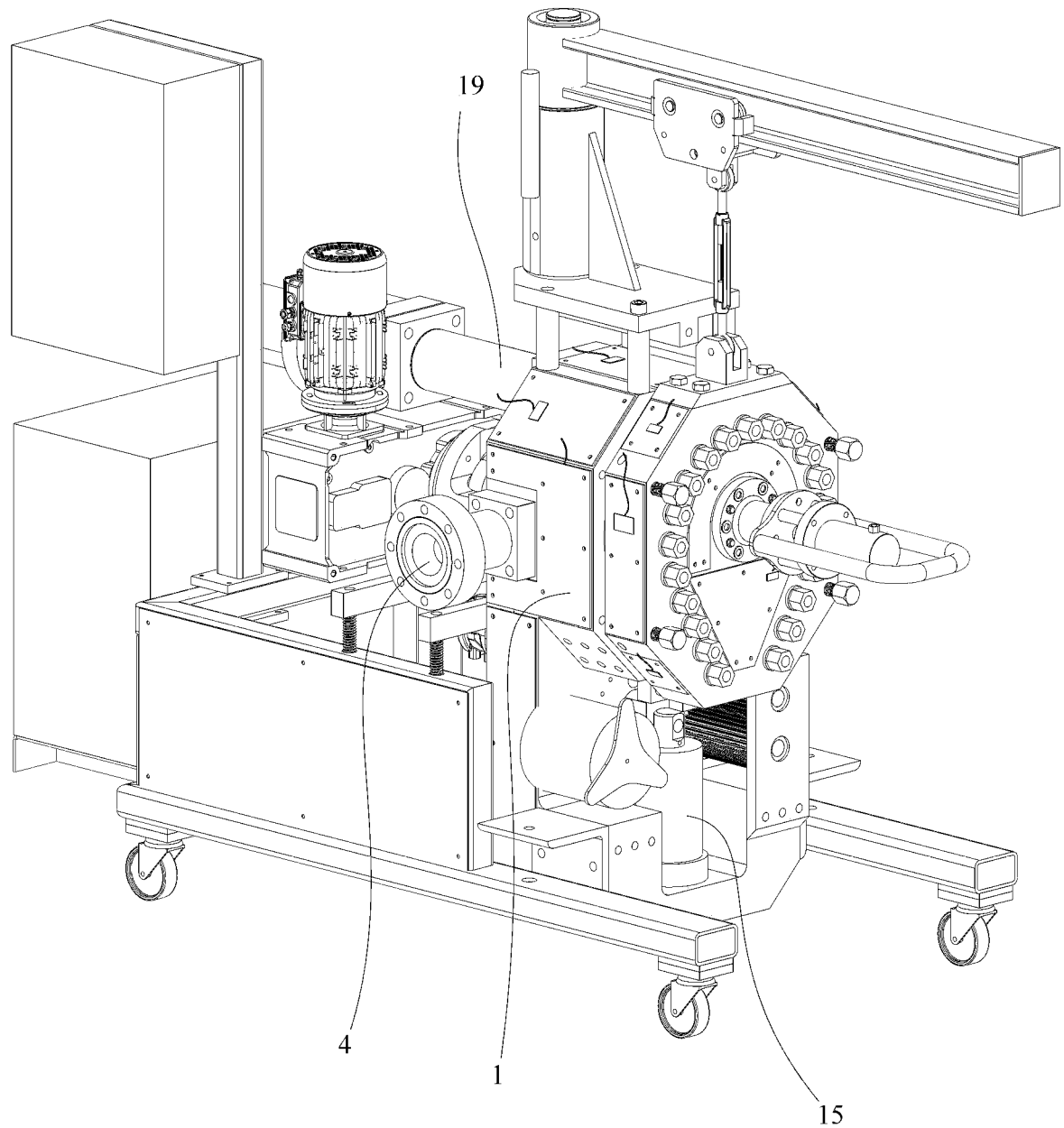
FIGS. 1-3 show the filtering device of the invention according to two perspective views (FIGS. 1 and 3) and a front plan view (FIG. 2)
Figure 2:
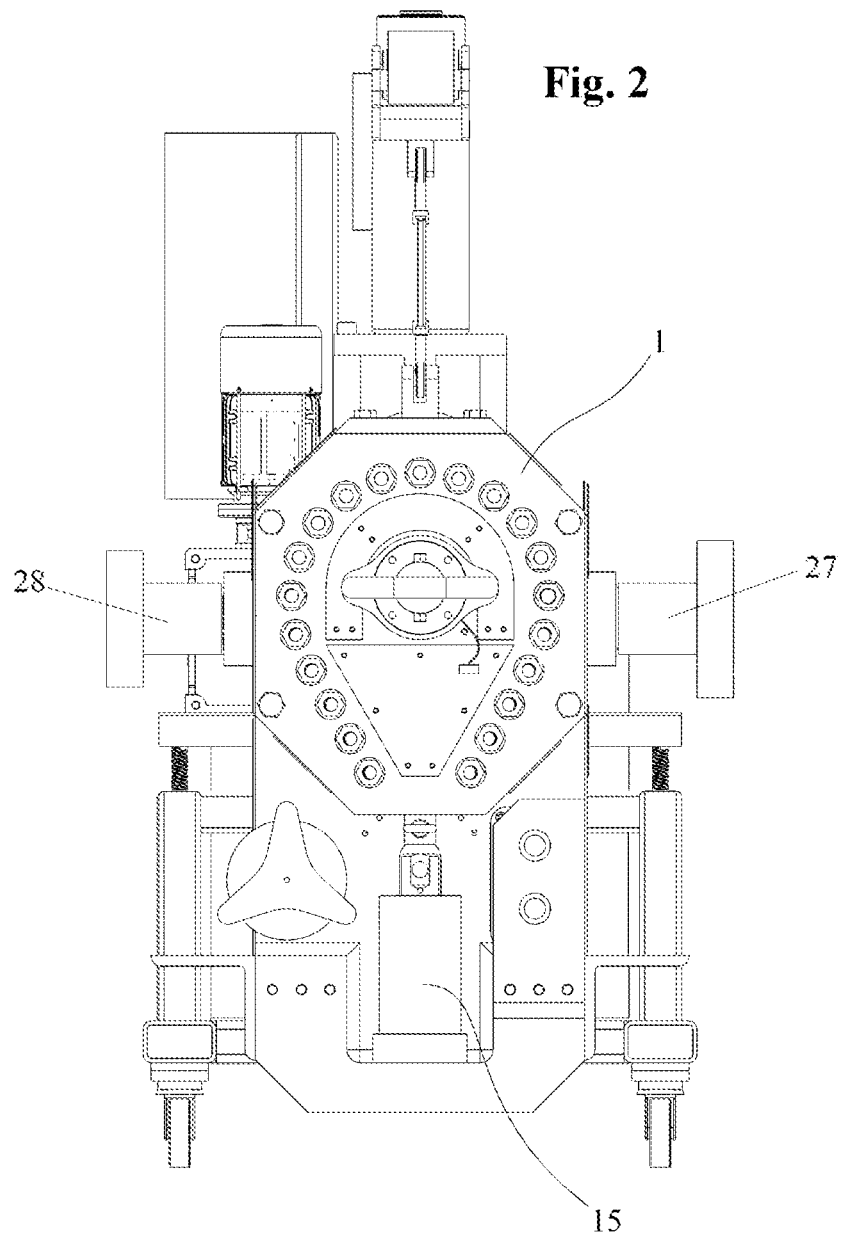
Figure 3:
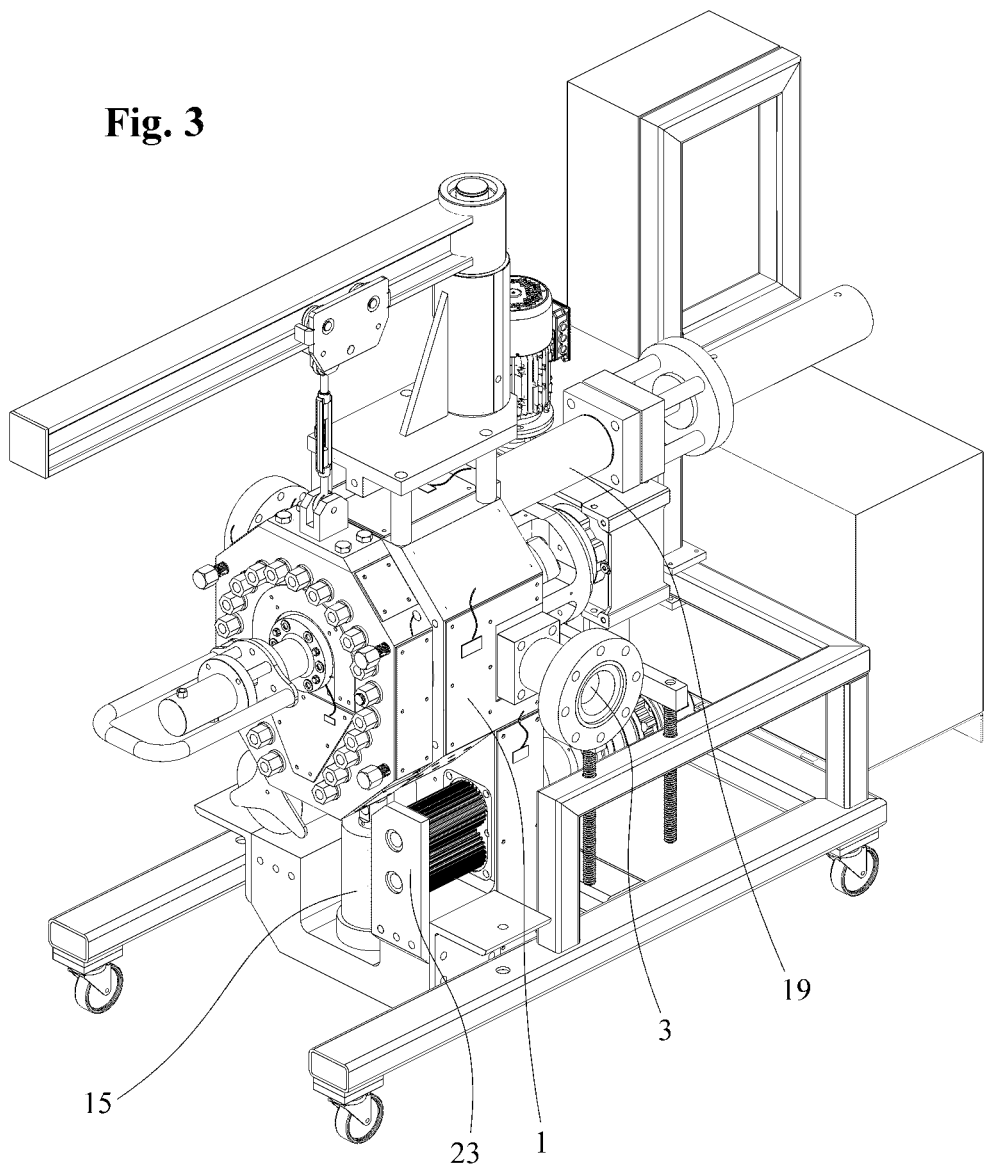
Figure 4:
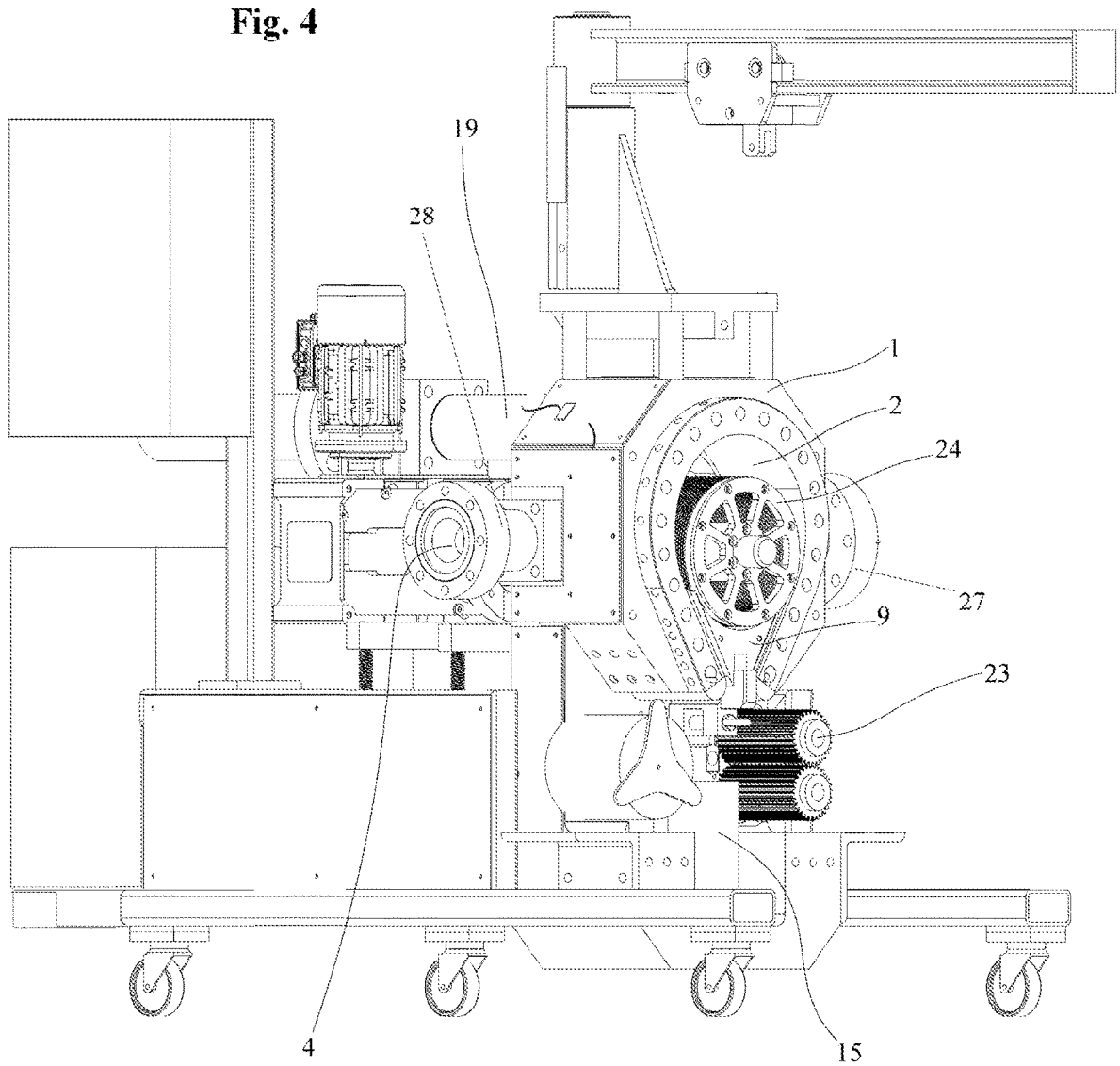
FIGS. 4-6 show what is shown in FIGS. 1 to 3 without the front cover, showing the chamber inside the body with the hollow perforated cylinder.
Figure 5:
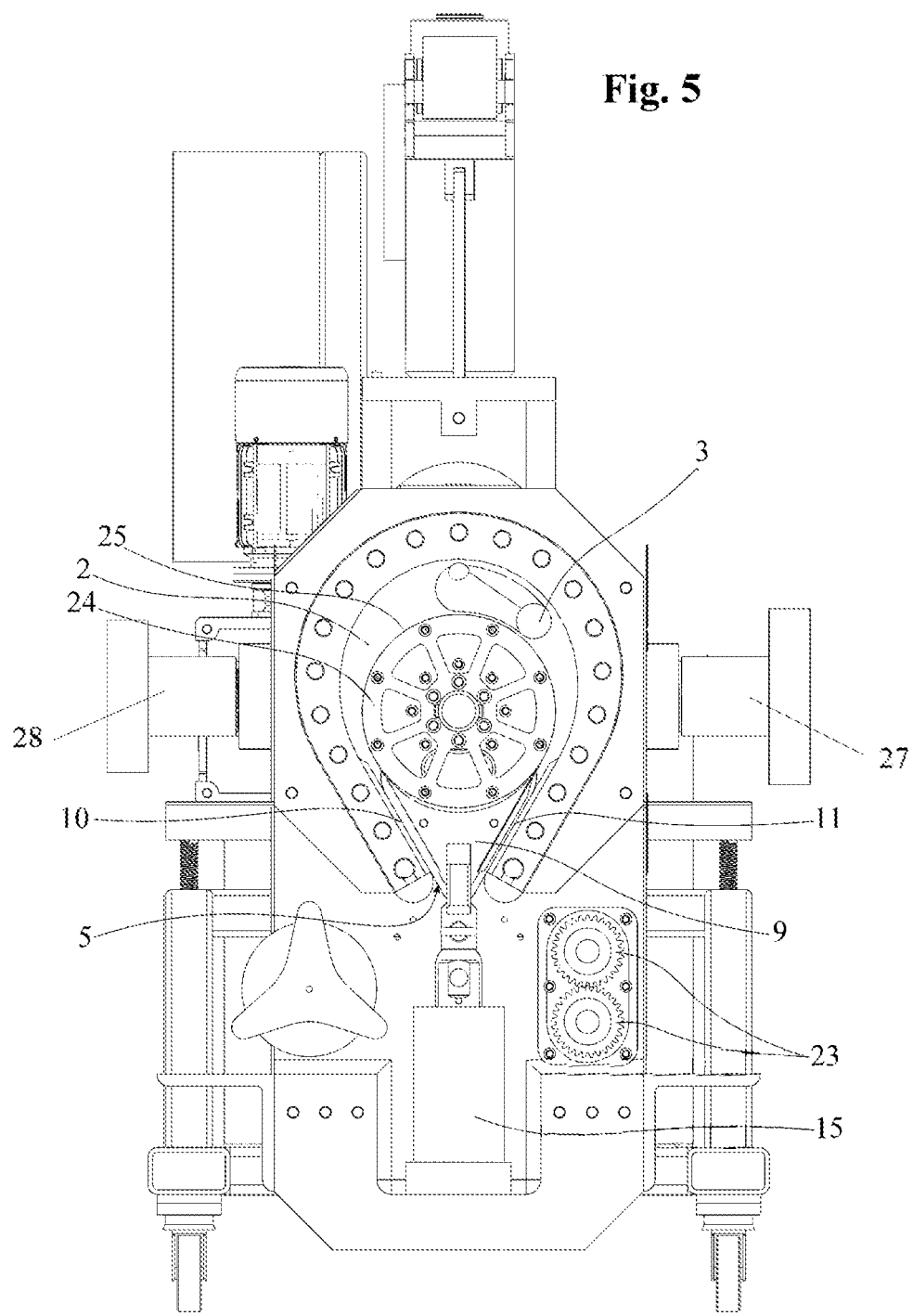
Figure 6:
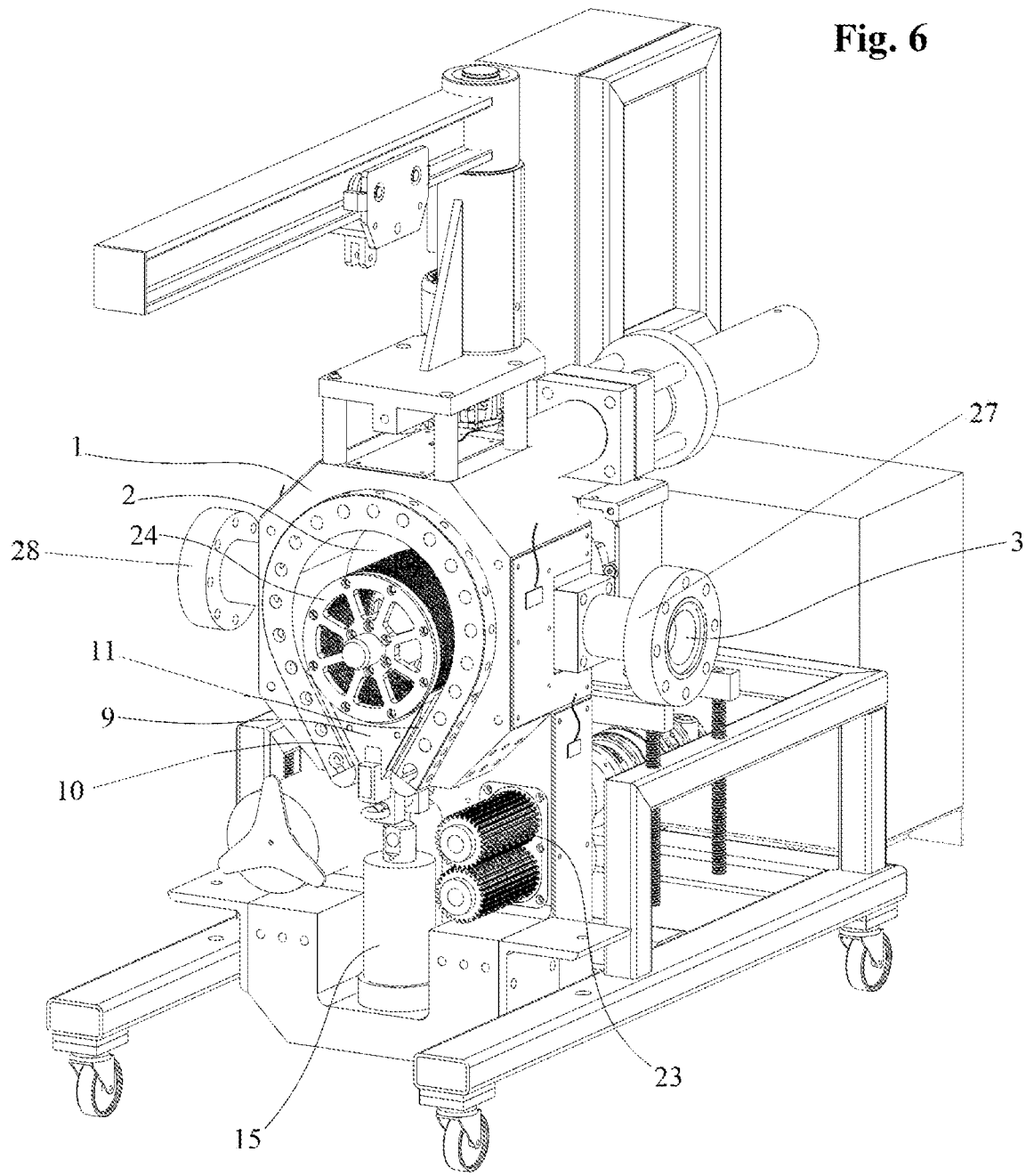
Figure 7:
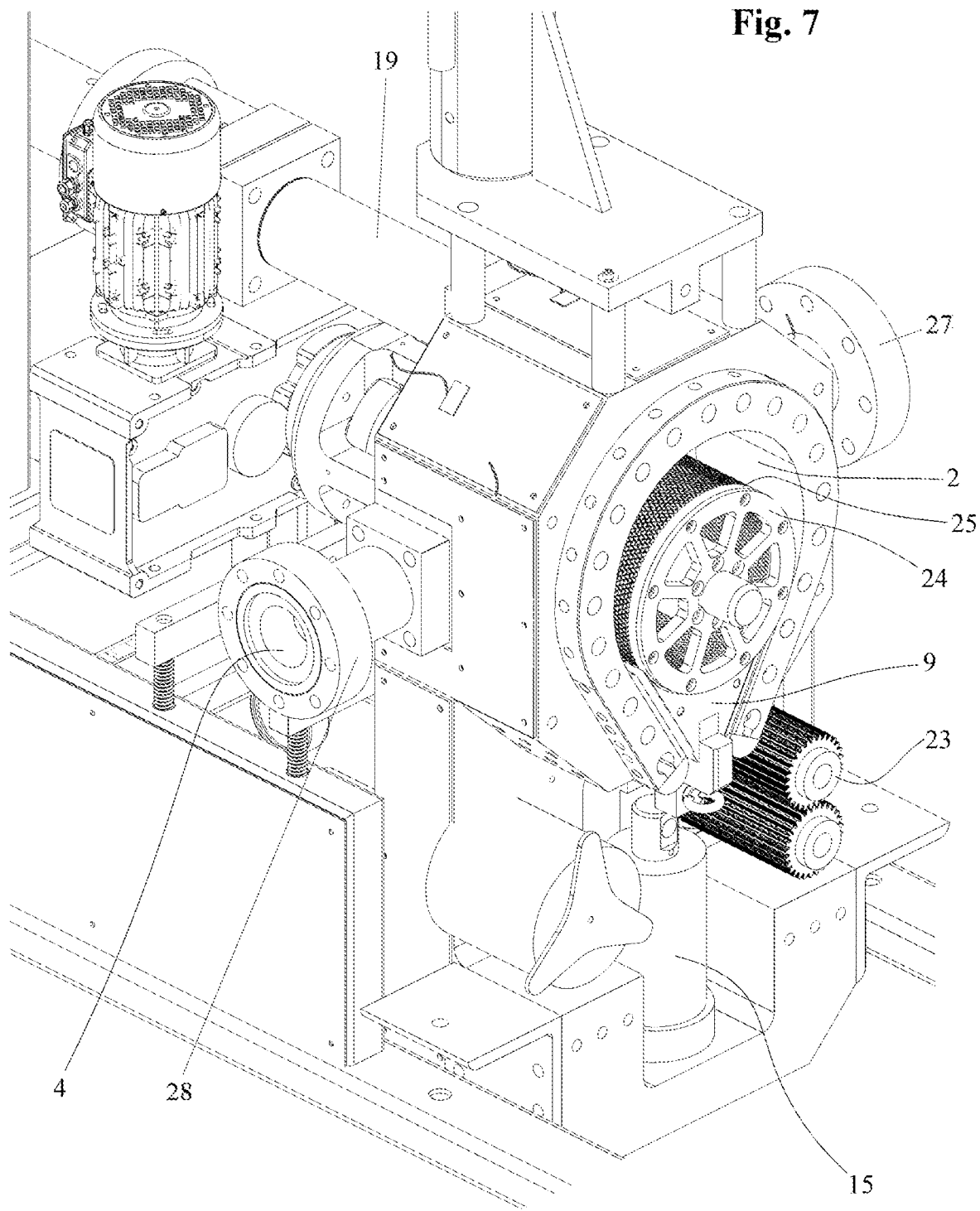
FIGS. 7-9 show what is shown in FIGS. 4 to 6 in an enlarged manner with greater detail.
Figure 8:
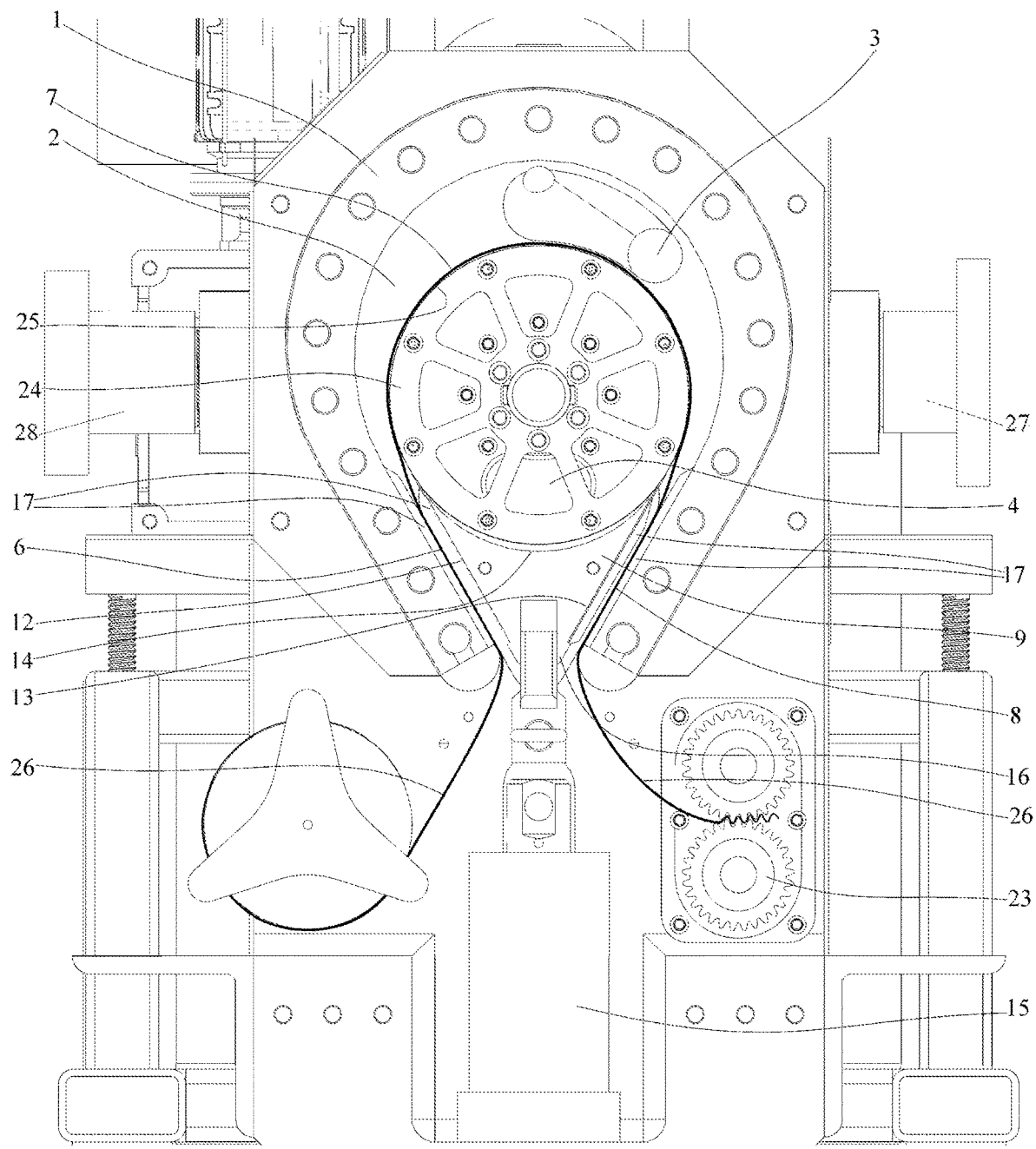
Figure 9:
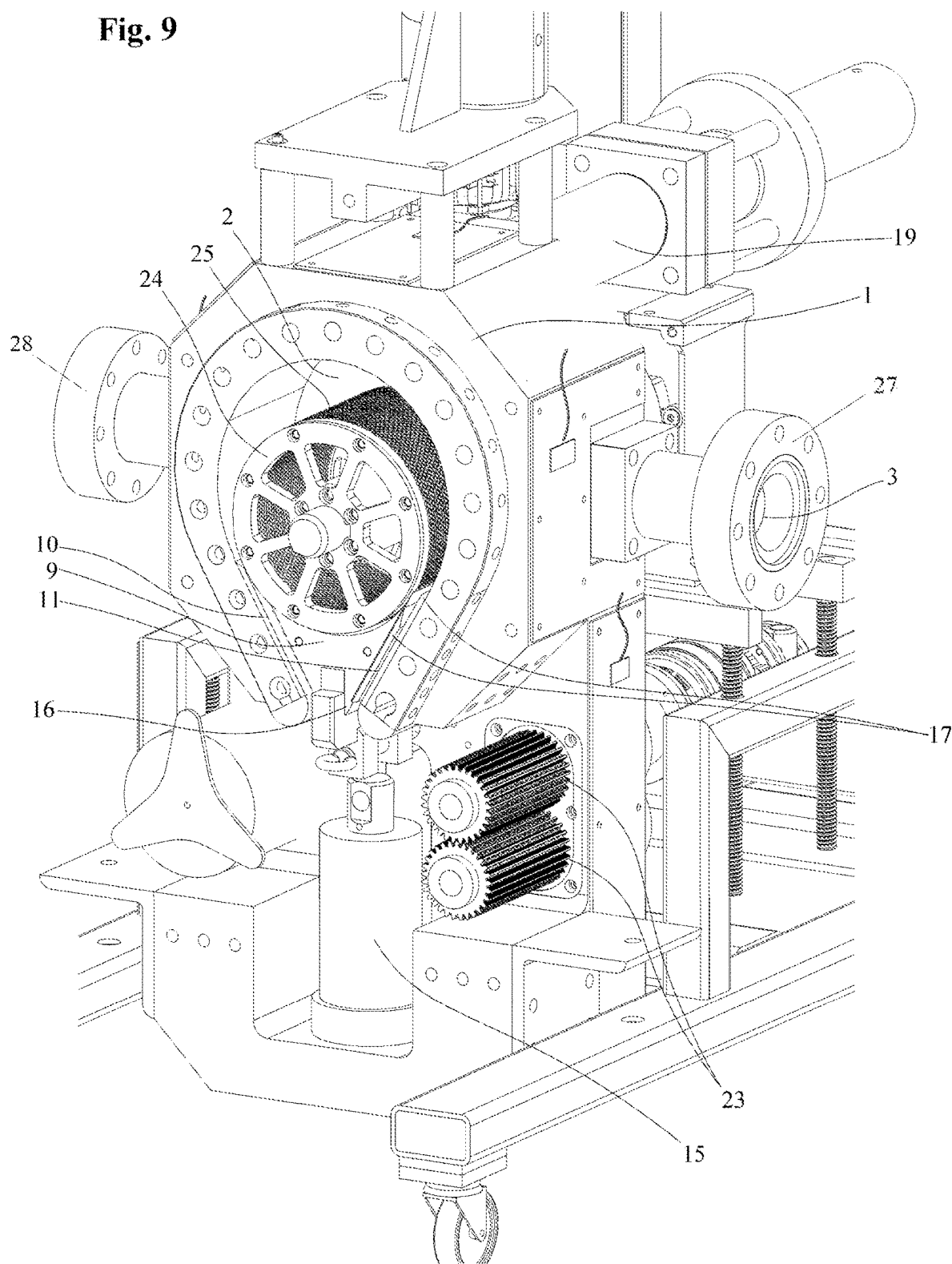
Figure 10:
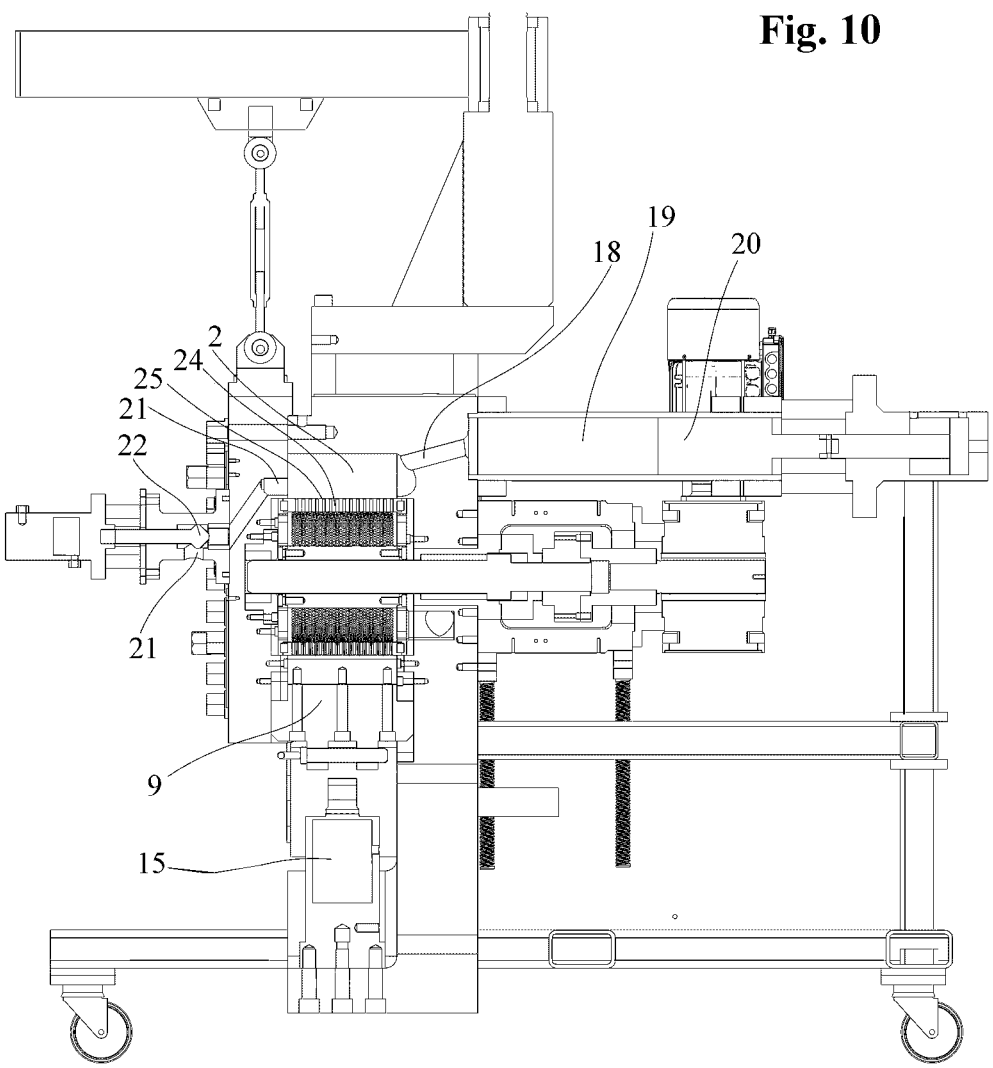
FIG. 10 shows the filtering device in section according to a vertical plane passing through the main axis of the hollow perforated cylinder.
Figure 11:
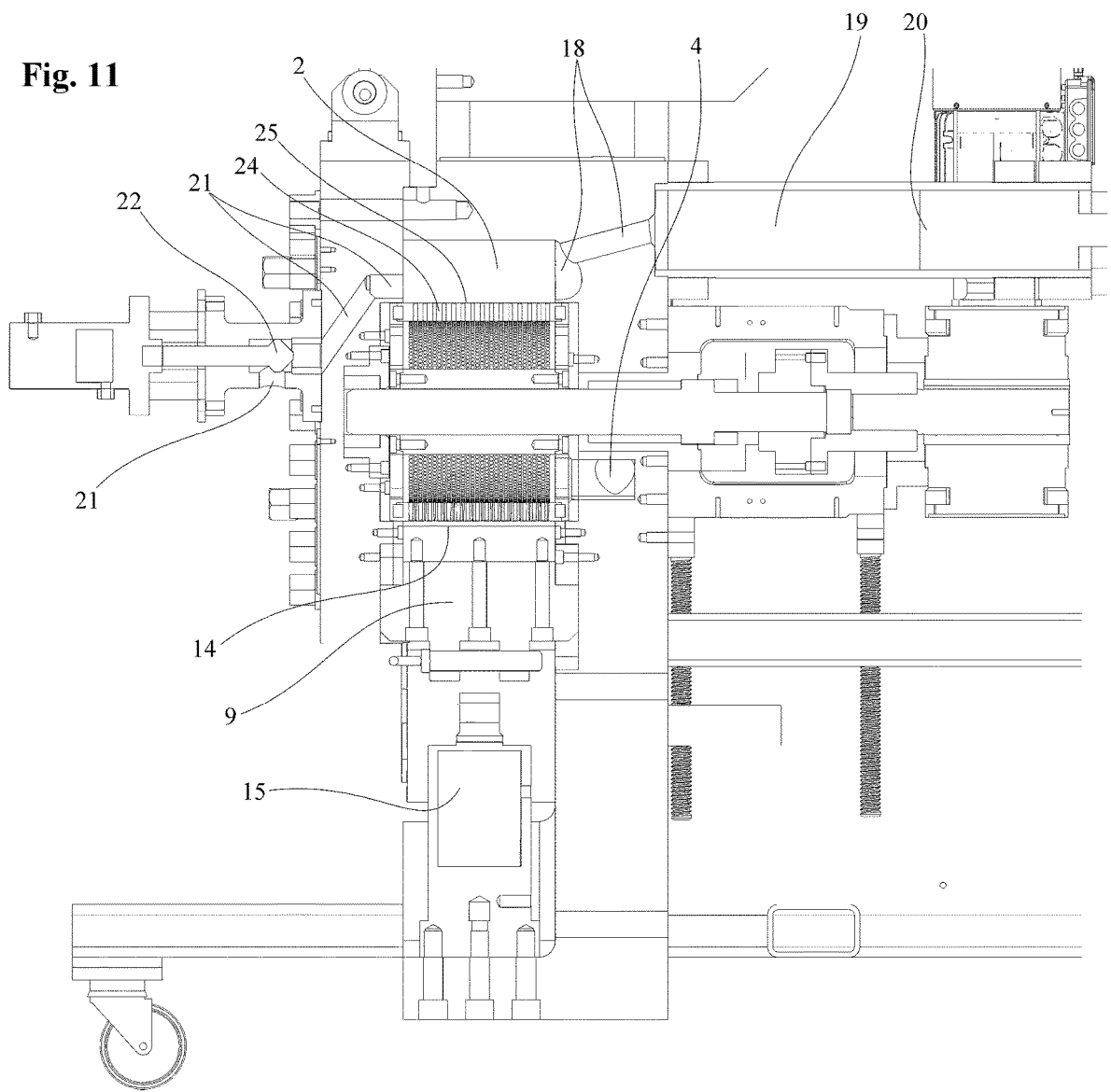
FIG. 11 shows what is shown in FIG. 10 in an enlarged manner with greater detail.
Figure 12:
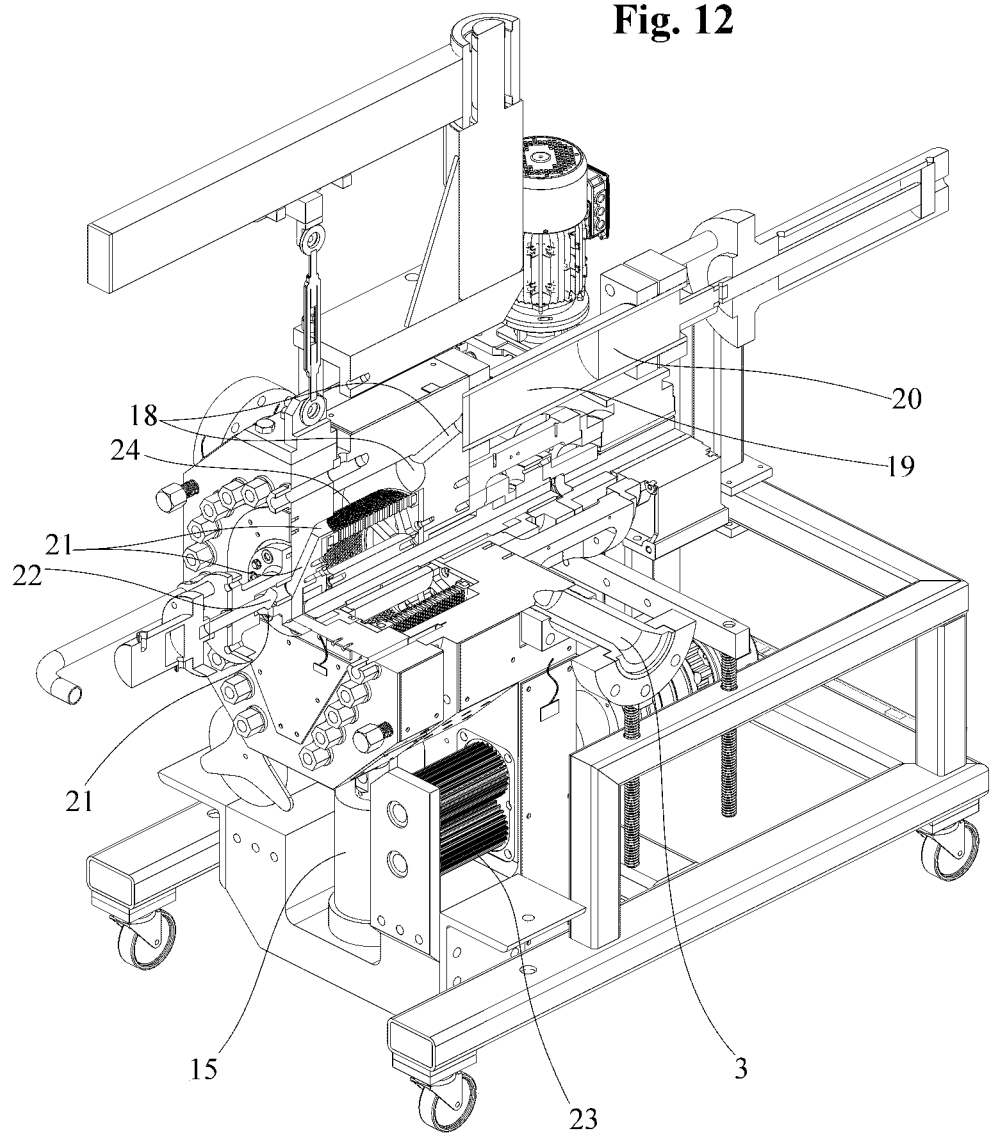
FIG. 12 shows the filtering device according to a perspective view and in a section composed according to a vertical plane and a horizontal plane passing through the main axis of the hollow perforated cylinder.
Figure 13:
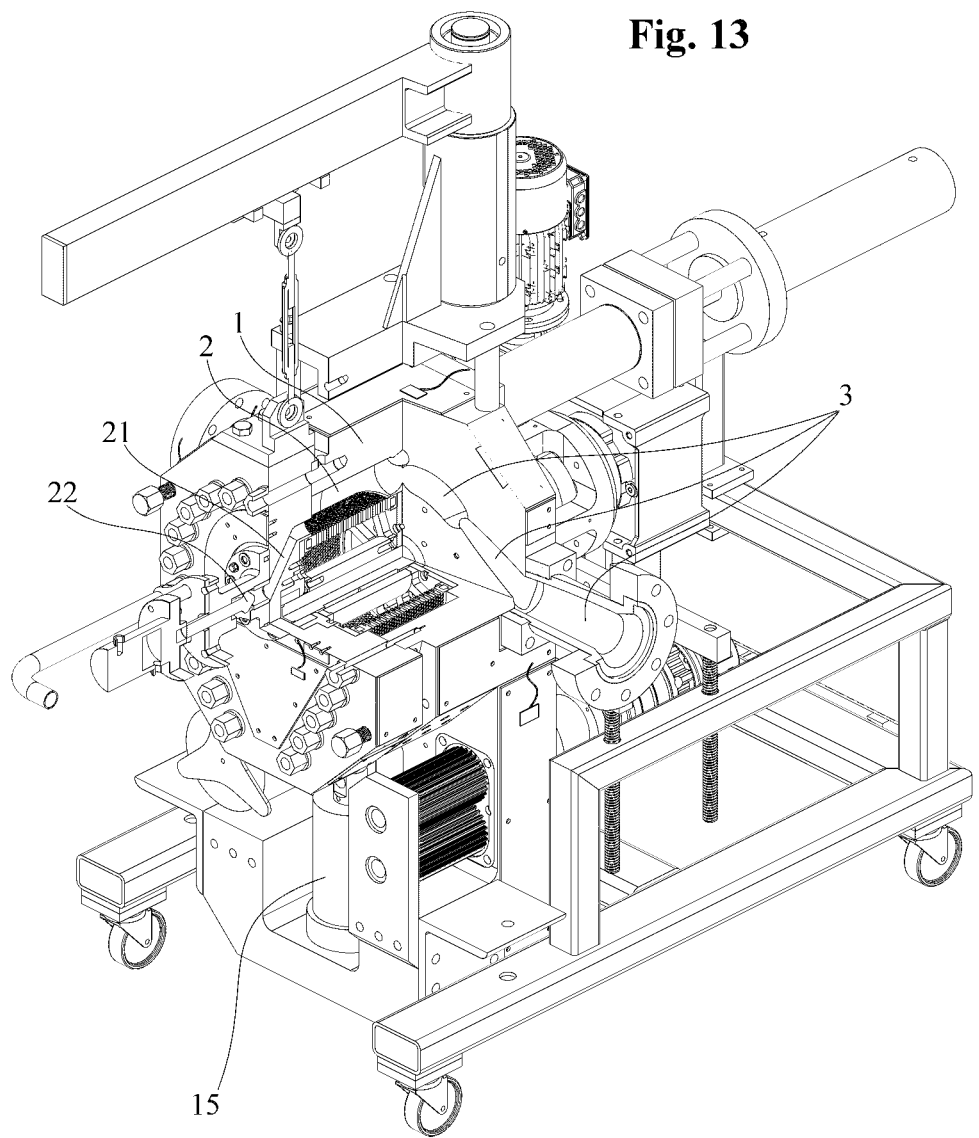
FIG. 13 shows the filtering device according to a perspective view and in a section composed according to a vertical plane, and a horizontal plane passing through the main axis of the hollow perforated cylinder and a plane orthogonal to the previous planes passing through the main axis of the inlet duct and highlighting the inlet opening of the inlet duct from the outside of the body to the inside of the chamber.

With reference to the drawings, the object of the invention consists of a filtering device for filtering molten plastic material (i.e., contaminated molten plastic material to be filtered), comprising a body 1 with a cavity on the inside of the body 1 that creates a chamber 2. The inside of the chamber 2 houses a hollow perforated cylinder 24 in a rotating manner, and engaging a part of the outer surface 25 of the hollow perforated cylinder 24 is a filtration mesh belt 26, which in fact is the real filter of the polluting material of the molten plastic material to be filtered.

The filtration mesh belt 26 remains engaged to a part of the outer surface 25 even with the rotation of the hollow perforated cylinder 24 and in a manner corresponding to the rotation of the hollow perforated cylinder 24, as it rotates with the progression of the rotation, a new section of the filtration mesh belt 26 is engaged and a similar section of mesh is released.

The new section of inlet mesh 6 that engages the outer surface 25 of the hollow perforated cylinder 24 enters the chamber 2 from the outside of the body 1 through an inlet path 6 of the connection opening 5 of the body 1, while the section of outlet-mesh 7 released is led outside the chamber 2 through an outlet path 11 of the connection opening 5.

The outlet-mesh 7 that comes out of the chamber 2 is clogged with the polluting material of the molten plastic material that has adhered to its surface, thereby bringing the polluting material outside the chamber 2.

In fact, the molten plastic material to be filtered enters from outside of the body 1 into the chamber 2 by means of a suitable inlet duct 27, and more particularly, through an inlet opening 3 of the inlet duct 27. The molten plastic material to be filtered enters a part of the chamber 2 that is disposed outside of the hollow perforated cylinder 24 such that the molten plastic material to be filtered is initially disposed outside of the hollow perforated cylinder 24. After the filtration of the molten plastic material, which passes through the filtration mesh belt 26 and the holes in the hollow perforated cylinder 24, reaching the inside of the hollow perforated cylinder 24, the filtered molten plastic material is brought outside of the body 1 by means of a suitable outlet duct 28, and more particularly, through an outlet opening 4 of the outlet duct 28.

The force that pushes the molten plastic material to enter chamber 2, to cross the filtration mesh belt 26 and the holes in the hollow perforated cylinder 24 and to exit the chamber 2 through the outlet opening 4 of the outlet duct 28, is exerted by the inlet pressure applied by a special pump or extruder of the molten plastic material.

In a pre-programmed manner or based on expected conditions, such as for example the overpressure of the material, or in a timed manner, all or part of the filtration mesh belt 26 engaging the outer peripheral surface 25 of the hollow perforated cylinder 24 is renewed with a new mesh 26.

In order to be able to easily renew this mesh 26, the hollow perforated cylinder 24 is rotated and on the outside of the body 1 the mesh 26 at the outlet 8 is driven by a winder/feeder 23.

In order to avoid the pressure in the chamber 2 making it difficult to replace the mesh 26 resting against the outer surface 25 of the hollow perforated cylinder 24, the pressure is suitably reduced during this operation.

Furthermore, again in order to make it easy to replace the section of mesh resting against the outer surface 25 of the cylinder 24 that is blocked, the mobile cone 9 is raised, towards the interior of the chamber 2, widening at least the outlet path 8 and possibly also the inlet path 10, preventing the outlet path 11 and possibly also the inlet path 10, from creating excessive friction in the movement of the outlet mesh 8.

Furthermore, reducing the pressure, during the replacement of the filtration mesh belt 26, in conjunction with the movement of the mobile cone 9, with the widening of the seats of the outlet path 11 and/or inlet 10 path prevents a considerable quantity of molten plastic material from escaping through the paths.

Further, the pressure reduction, during the renewal of the mesh 26, in conjunction with the movement of the mobile cone 9, considerably reduces the power required of the actuator 15, associated with the mobile cone 9 in the part facing the outside of the body 1, that is to the cusp 16 of the mobile cone 9.

In order to reduce the pressure inside the chamber 2 inside the body 1, of the molten plastic material, it is envisaged that this can be possibly implemented by using the pump or extruder outside the body 1.

In the event that it is not possible or appropriate to use the external pump to reduce the pressure of the molten plastic material, the filtering device has at least one of the following characteristics:
  a valved opening 21, which can be controlled, which acts as a bypass between the inside of the chamber 2 and the outside of the body 1;
  a variable volume storage tank 19 with a movable piston 20.

The valved opening 21 is simple to make and effective, providing communication between the inside of the chamber 2 under pressure with the outside of the body 1 at ambient pressure, and a controllable valve 22 is interposed in the communication duct of this opening. When it is necessary to reduce the pressure entirely to the chamber 2 of the molten plastic product, the valve 22 is opened, rapidly decreasing the pressure inside the chamber 2 with the release of a limited quantity of molten material to the outside through the communication duct of the opening.

In the different way of decreasing the pressure inside the chamber 2, an accumulation or storage tank 19 is provided, connected via a bypass (i.e., channel with openings) 18 to the internal chamber 2, possibly with a valve, which is made to open and consequently the accumulation tank 19 is filled with the molten material, decreasing the pressure in the internal chamber 2.

Subsequently, once there is no longer a need for a reduced pressure, a movable piston 20 pushes the molten material back into the chamber inside the body which had previously been stored inside the accumulation tank 19.

In the eventuality the valved opening 21 is adopted, and also when the accumulation tank 19 is used, the relative ducts open and preferably connect that part of the chamber where the pressure reduction on the base wall 14 of the mobile cone 9 is more effective, which, for example, could be the one fed and containing the unfiltered molten material, carried directly by the inlet duct 3 of the molten plastic material, i.e. that part of the chamber 2 which relates to the external part of the hollow perforated cylinder 24, with this connection, therefore, the molten plastic material, coming from the extruder or from the pump, is more easily reduced in the overpressure closer to the source thereof.

In any case, facilitated or not by the presence of the pressure reduction devices described above, the displacement of the mobile cone 9 can increase the section of the passage at least of the outlet path 11, and possibly of the inlet path 10, respectively moving the second side wall of the cone 13, and possibly the first side wall of the cone 12 from the side walls that create the connection opening 5 of the body 1.

Effectively, taking into account the friction caused by the sliding of the filtration mesh belt 26 during its replacement, in the sections in which the inlet mesh 6 and the outlet mesh 8 affect the respective inlet path 10 and the respective path of outlet 11 the walls are protected with plates 17 made with material that is suitably resistant to abrasion by the friction of the filtration mesh belt 26 moved in the replacement process.

What is claimed is:

1. A filtering device for filtering molten plastic material, comprising:
  a body;
  a chamber inside of the body;
  a hollow perforated cylinder that rotates around a main axis thereof inside of the chamber;

an inlet opening on the body for allowing the molten plastic material to enter inside of the chamber so that the molten plastic material can be filtered inside of the chamber;

an outlet opening on the body for allowing the molten plastic material to exit from the body after the molten plastic material is filtered inside of the chamber;

a connection opening that connects the outside of the body with the chamber on the inside of the body;

a filtration mesh belt that filters the molten plastic material inside of the chamber, wherein the filtration mesh belt enters the chamber through the connection opening and exits the chamber through the connection opening after filtering the molten plastic material inside of the chamber, the filtration mesh belt having a section of inlet-mesh that enters the chamber from outside of the body through an inlet path of the connection opening, a section of adjoining-mesh that engages an outer surface of the hollow perforated cylinder, and a section of outlet-mesh that exits the body from the chamber through an outlet path of the connection opening; and a mobile cone that has a first side wall, a second side wall, a base wall between the first and second side walls, and a cusp between the first and second side walls and below the base wall, the base wall of the mobile cone facing the chamber so as to underly the hollow perforated cylinder inside of the chamber;

wherein the first side wall of the mobile cone, together with the body, forms the inlet path of the connection opening and the second side wall of the mobile cone, together with the body, forms the outlet path of the connection opening;

wherein the mobile cone is movable downwardly and upwardly between a closed position and an open position;

wherein when the mobile cone is moved downwardly into the closed position, the first and second side walls of the mobile cone are moved closer to the body, with the section of inlet-mesh of the filtration mesh belt being disposed within the inlet path of the connection opening and the section of outlet-mesh of the filtration mesh belt being disposed within the outlet path of the connection opening; and wherein when the mobile cone is moved upwardly into the open position, the first and second side walls of the mobile cone are moved farther from the body, with the section of inlet-mesh of the filtration mesh belt being slidable within the inlet path of the connection opening and the section of outlet-mesh of the filtration mesh belt being slidable within the outlet path of the connection opening.

2. The filtering device of claim 1 wherein the filtration mesh belt continuously enters and exits the chamber as the hollow perforated cylinder rotates around the main axis thereof inside of the chamber.

3. The filtering device of claim 1 wherein the inlet opening is adapted to receive the molten plastic material from a pump or an extruder.

4. The filtering device of claim 1 wherein the base wall of the mobile cone has a profile corresponding to an arc of a circle.

5. The filtering device of claim 1 wherein, in a front plan view of the filtering device, the base wall of the mobile cone has an overall lateral width greater than an overall lateral width of the cusp of the mobile cone.

6. The filtering device of claim 1 wherein the first and second side walls of the mobile cone diverge upwardly towards the hollow perforated cylinder inside of the chamber.

7. The filtering device of claim 1 wherein the inlet and outlet paths of the connection opening diverge upwardly towards the hollow perforated cylinder inside of the chamber.

8. The filtering device of claim 1 wherein the mobile cone is movable by an actuator that is connected to the cusp of the mobile cone.

9. The filtering device of claim 1 wherein the mobile cone and/or the body at the inlet and/or outlet paths of the connection opening have plates made of a hardened/bonded material, thereby limiting wear on the mobile cone and/or the body resulting from the filtration mesh belt entering the inlet path and/or exiting the outlet path of the connection opening.

10. The filtering device of claim 1 wherein the body has an opening between the inside of the chamber and a storage tank for storing the molten plastic material from the chamber when changing and replacing the filtration mesh belt, thereby decreasing a pressure of the molten plastic material inside of the chamber.

11. The filtering device of claim 10 wherein the storage tank is a variable volume storage tank and has a movable piston therein that can increase or decrease the capacity of the storage tank, wherein the piston moving to increase the capacity of the storage tank facilitates the storage of the molten plastic material from the chamber, and wherein the piston moving to decrease the capacity of the storage tank facilitates the return of the molten plastic material into the chamber.

12. The filtering device of claim 1 wherein the body has a valved opening between the inside of the chamber and the outside of the body so that the chamber can open by operating a valve inserted in the valved opening, thereby releasing the molten plastic material from the chamber and decreasing a pressure of the molten plastic material inside of the chamber.

13. The filtering device of claim 1 wherein the filtering device further comprises a winder/feeder on the outside of the body for storing/advancing or pulling the filtration mesh belt out of the body.

* * * * *